(12) United States Patent
Gill et al.

(10) Patent No.: US 10,649,423 B2
(45) Date of Patent: *May 12, 2020

(54) CONTEXTUAL HOME AUTOMATION CONTROLLER

(71) Applicant: Josh.ai LLC, Denver, CO (US)

(72) Inventors: Timothy Earl Gill, Denver, CO (US); Alex Nathan Capecelatro, Los Angeles, CA (US); Jason Hsin, Los Angeles, CA (US); Paul Philip Russo, Denver, CO (US)

(73) Assignee: Josh.ai LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,015

(22) Filed: May 22, 2019

(65) Prior Publication Data

US 2019/0391542 A1     Dec. 26, 2019

Related U.S. Application Data

(63) Continuation of application No. 15/683,571, filed on Aug. 22, 2017, now Pat. No. 10,345,773.

(51) Int. Cl.
| | |
|---|---|
| *G05B 15/02* | (2006.01) |
| *G06F 3/044* | (2006.01) |
| *G06F 3/01* | (2006.01) |
| *G06F 3/0488* | (2013.01) |
| *G06F 3/0481* | (2013.01) |
| *G06F 3/0484* | (2013.01) |

(52) U.S. Cl.
CPC ............ *G05B 15/02* (2013.01); *G06F 3/044* (2013.01); *G06F 3/016* (2013.01); *G06F 3/0488* (2013.01); *G06F 3/04817* (2013.01); *G06F 3/04847* (2013.01)

(58) Field of Classification Search
CPC ......... G05B 15/02; G06F 3/044; G06F 3/016; G06F 3/04817; G06F 3/04847; G06F 3/0488
See application file for complete search history.

(56) References Cited

U.S. PATENT DOCUMENTS

| | | |
|---|---|---|
| 8,421,602 B2 | 4/2013 | Madonna |
| 9,175,871 B2 | 11/2015 | Gourlay |
| 9,222,693 B2 | 12/2015 | Gourlay |
| 9,890,971 B2 | 2/2018 | Ribbich |
| (Continued) | | |

OTHER PUBLICATIONS

Matt Burns, TechCrunch, SevenHugs Smart Report Controls Devices by Just Pointing, Dec. 7, 2015.

*Primary Examiner* — Peter D McLoone
(74) *Attorney, Agent, or Firm* — Van Pelt, Yi & James LLP

(57) ABSTRACT

A currently touched position on a capacitive touch interface is determined based at least in part on sensing a capacitance associated with the currently touched position along a geometric shape, wherein the capacitive touch interface comprises a touchable surface at least a portion of which defines the geometric shape. The currently touched position is mapped to a corresponding value of an attribute associated with a current context. The corresponding value of the attribute is used to operate an external system associated with the current context in a manner determined at least in part by the corresponding value of the attribute. A feedback associated with the determined currently touched position and the current context is provided via the capacitive touch interface.

21 Claims, 9 Drawing Sheets

(56) References Cited

U.S. PATENT DOCUMENTS

| | | |
|---|---|---|
| 9,920,946 B2 | 3/2018 | Gourlay |
| 9,971,453 B2 | 5/2018 | Alberth, Jr. |
| 2003/0105637 A1 | 6/2003 | Rodriguez |
| 2008/0079604 A1 | 4/2008 | Madonna |
| 2012/0005590 A1 | 1/2012 | Lombard |
| 2014/0319232 A1 | 10/2014 | Gourlay |
| 2017/0146260 A1 | 5/2017 | Ribbich |
| 2017/0234562 A1 | 8/2017 | Ribbich |
| 2017/0243577 A1 | 8/2017 | Wingate |
| 2017/0336770 A1 | 11/2017 | MacMillan |
| 2018/0107336 A1 | 4/2018 | Alberth, Jr. |
| 2018/0233152 A1 | 8/2018 | Olaya |
| 2018/0247065 A1 | 8/2018 | Rhee |

CONTEXTUAL HOME AUTOMATION CONTROLLER

CROSS REFERENCE TO OTHER APPLICATIONS

This application is a continuation of co-pending U.S. patent application Ser. No. 15/683,571 entitled CONTEXTUAL HOME AUTOMATION CONTROLLER filed Aug. 22, 2017 which is incorporated herein by reference for all purposes.

BACKGROUND OF THE INVENTION

Technology advances have increased automation for products, devices, and systems, including automation in the home. Typically, a user may control said automation via a user interface that allows them to invoke a function, feature, and/or operation such as by asserting input including a question, statement, and/or a command, using a physical static button like a light switch/volume knob, via an app interface, or using natural language speech. There is a need to design and implement user interface devices that require little or no training to learn to complement natural language speech to control home automation.

BRIEF DESCRIPTION OF THE DRAWINGS

Various embodiments of the invention are disclosed in the following detailed description and the accompanying drawings.

DETAILED DESCRIPTION

Figure 1:
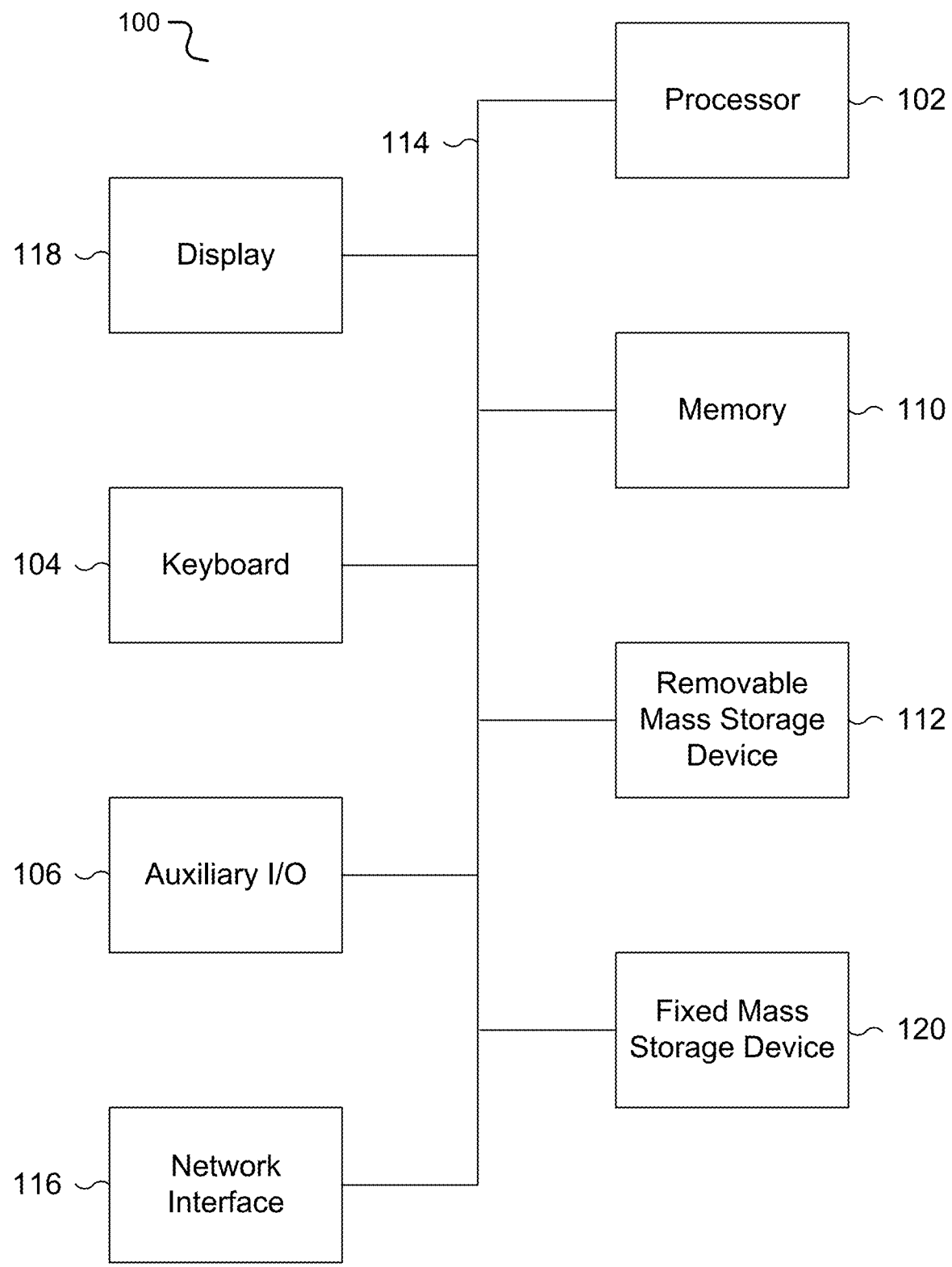
FIG. 1 is a functional diagram illustrating a programmed computer/server system for control of contextual input in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A contextual home automation controller is disclosed. The controller comprises a context-sensitive physical user interface with context-associated visual feedback/confirmation. The controller may comprise a capacitive sensing ring with a multicolor display. The controller determines a current context for home automation and may provide a physical slider-style and/or selection based user interface.

In one embodiment, the controller also comprises one or more audio input devices to input natural language phrases from a user, and uses these phrases to determine a current context, for example "Josh, dim the lights" may be associated with a current context with a light dimmer switch in a zone/room where the controller is located. The capacitive sensing ring may turn yellow to indicate "light dimmer control" and the user may indicate a percentage of brightness based on a sliding a finger around the capacitive sensing ring. The same user may subsequently utter "Josh, turn on CNN" which may be associated with a current context with a volume level of a television set in the same zone/room playing CNN. The capacitive sensing ring may turn orange to indicate "television volume control" and the user may indicate a percentage of volume based on sliding a finger around the same capacitive sensing ring.

In one embodiment, the user may utter "Josh, turn on the television" which may be associated with a current context with a volume level of a television set in the same zone/room, and/or a channel setting of a television set in the same zone/room. In one embodiment, the capacitive ring (208) may be split to control both volume as orange and channel as purple simultaneously. In one embodiment, the capacitive ring (208) may be user or factory set to default to volume or channel. In one embodiment, a zone/room may have a default current context without any user commands, for example volume of a television in a television room. In one embodiment, a user and/or system installer may set the associated zone/room of a device (204).

In one embodiment, the controller also comprises one or more environmental sensors including motion sensors, temperature sensors, and light sensors. The sensors may assist the audio input devices by waking or muting them, and/or may themselves determine a current context, for example if the temperature is above 80 degrees Fahrenheit, the capacitive sensing ring may turn blue to indicate "air conditioner control" and the user may indicate a temperature set point based on sliding a finger around the capacitive sensing ring. Similarly, a light sensor may assist the processor determine a current context based at least in part on light input.

FIG. 1 is a functional diagram illustrating a programmed computer/server system for control of contextual input in accordance with some embodiments. As shown, FIG. 1 provides a functional diagram of a general purpose computer system programmed to provide contextual input processing in accordance with some embodiments. As will be apparent, other computer system architectures and configurations can be used for contextual input processing.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118. In one embodiment, processor 102 is not a primary processor for the system, wherein the hardware includes a touch ring 106 that sends data to a cloud-based primary processor via a network interface 116.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen and/or capacitive touch interface, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
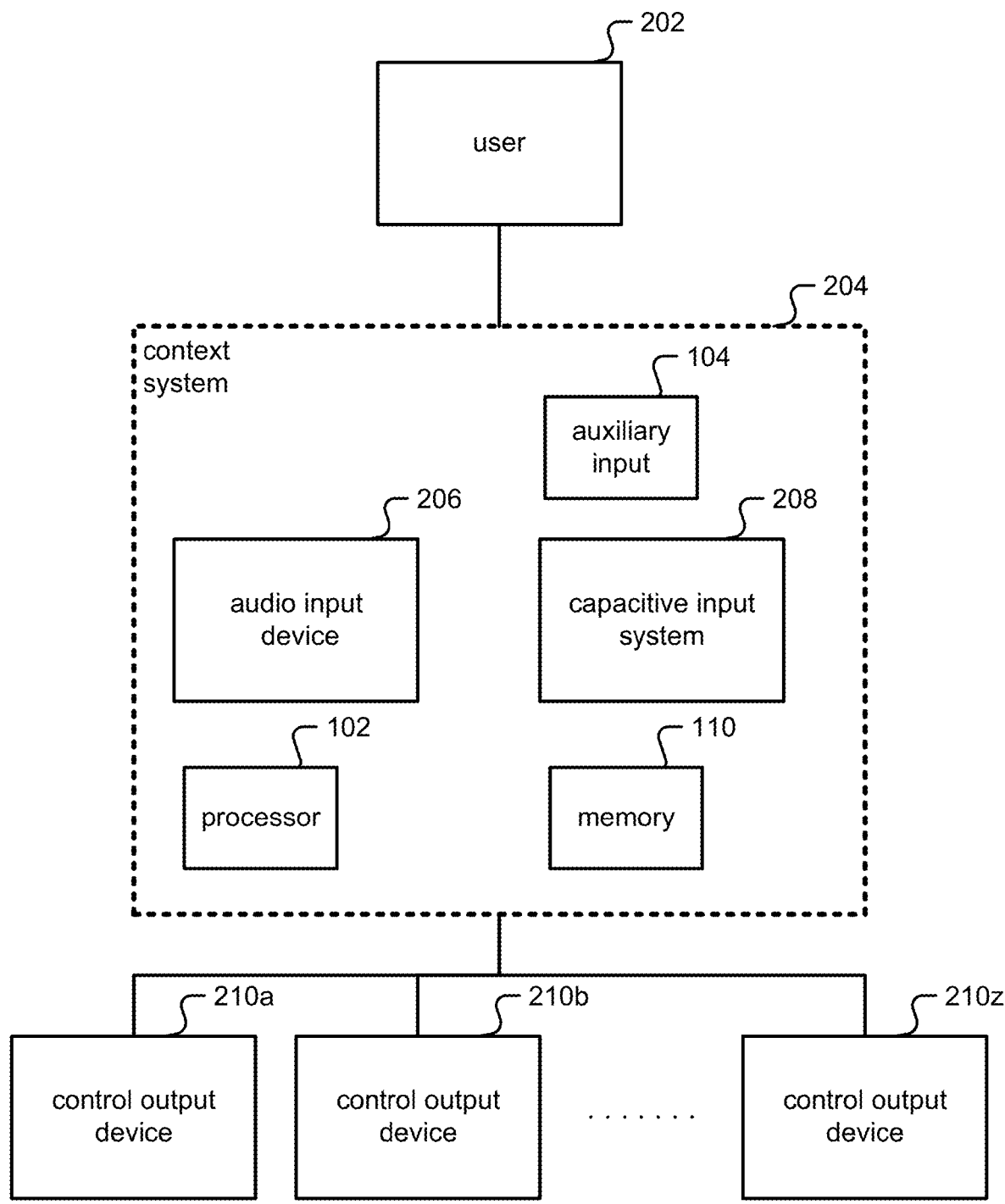
FIG. 2 is a block diagram illustrating an embodiment of a system for contextual input processing.

FIG. 2 is a block diagram illustrating an embodiment of a system for contextual input processing. User (202) is coupled to contextual system (204), in some cases through an audio input device (206). In one embodiment, contextual system (204) is a computer system as shown in FIG. 1 and includes processor (102) and memory (110). In one embodiment, auxiliary inputs such as one or more buttons, a motion sensor, a temperature sensor, a light sensor, a humidity sensor, and/or other sensors (104) are included to aid in speech processing or determining context. A capacitive input device (208) is also part of context system (204). After contextual input processing the input device (208) may control to one or more control output devices (210), here shown with three devices (210a), (210b), and (210z). In one embodiment, the system of FIG. 2 is embodied in a tablet computing device using a capacitive input touchscreen (208). In another embodiment, the system of FIG. 2 is embodied in a discrete device using a capacitive ring (208).

Figure 3:
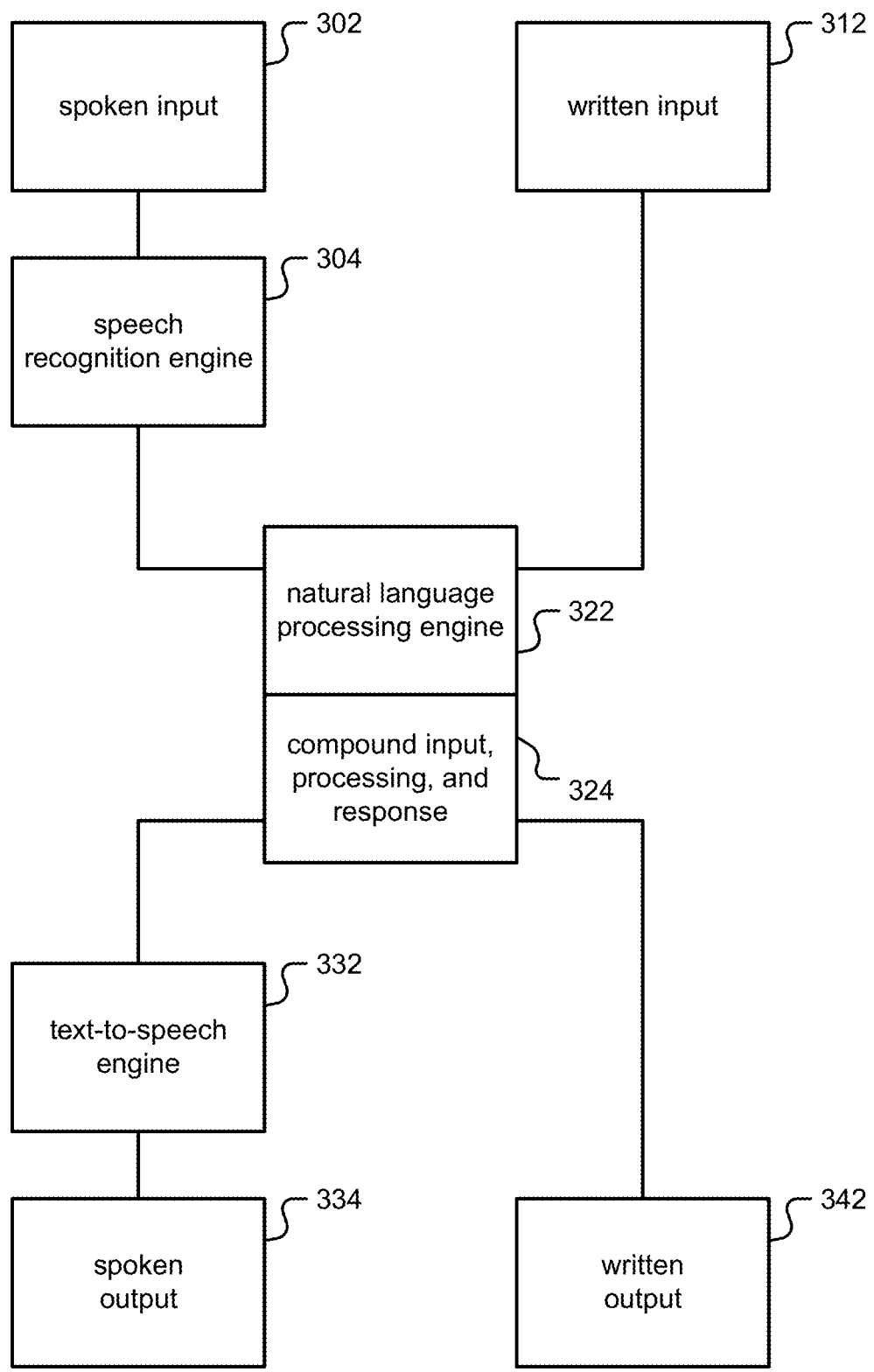
FIG. 3 is a block diagram illustrating an embodiment of a system for complex input speech and written processing.

FIG. 3 is a block diagram illustrating an embodiment of a system for complex input speech and written processing. In one embodiment, the system of FIG. 3 is carried out by the audio input device (206) and processor (102) of FIG. 2.

As FIG. 3 illustrates, input may be spoken and/or written, and output may be spoken and/or written. Spoken input (302) is processed by a speech recognition engine (304) before being passed to the natural language processing engine (322). Written input (312) may be processed directly by the natural language processing engine (322). Note that in some cases, the written input (312) may have little or no punctuation, capitalization, and/or proper nouns recognized. Natural language processing engine (322) applies rules and couples the system for complex/compound input, processing, and response (324). User notification of responses includes written output (342) from system (324), and may include a text-to-speech engine (332) to provide spoken output (334) as well.

In one embodiment, the system of FIG. 2 has no complex input speech and written processing and is without the system of FIG. 3. For example, a touch ring (208) starts on lights, and tapping in the middle rotates ring control from controlling lights to controlling music. Another tap in the middle rotates ring control further to controlling shades, TV, thermostat, and so forth.

Figure 4A:
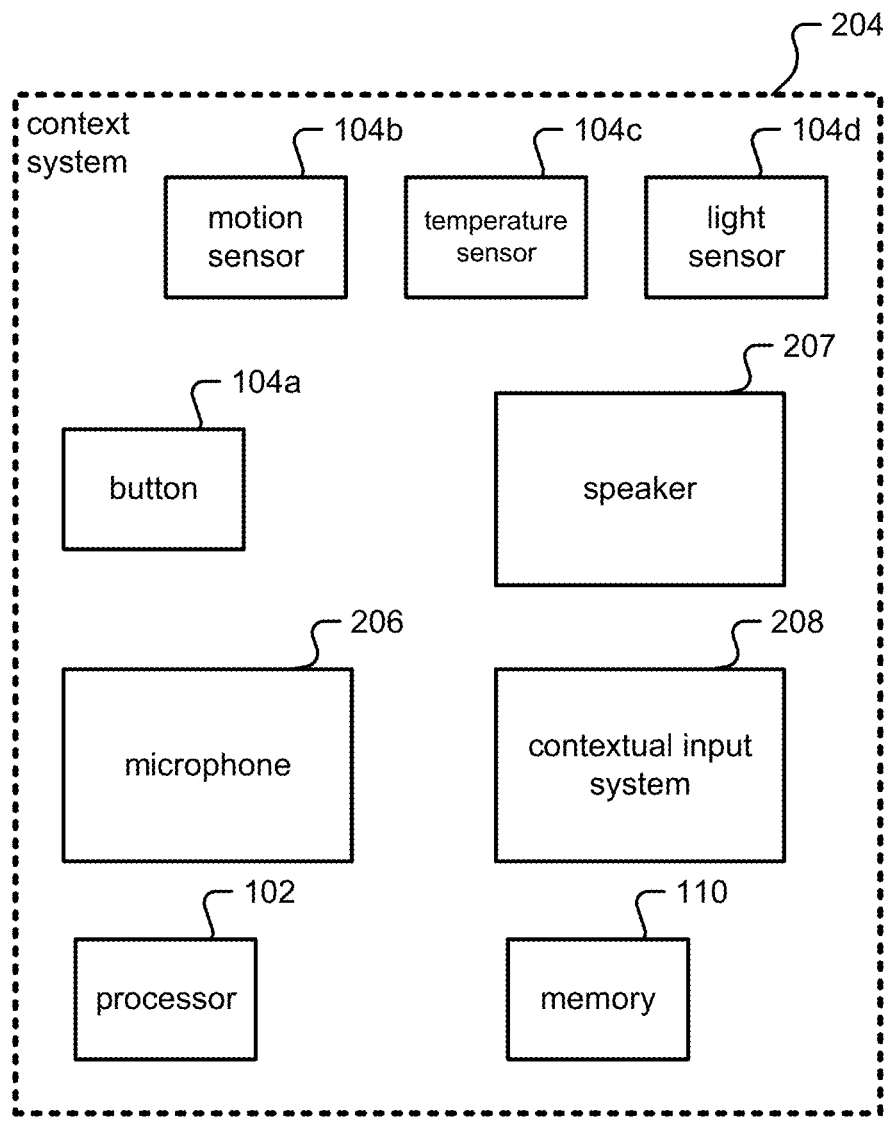
FIG. 4A is a block diagram illustrating an embodiment of a system for contextual control.
Figure 4B:
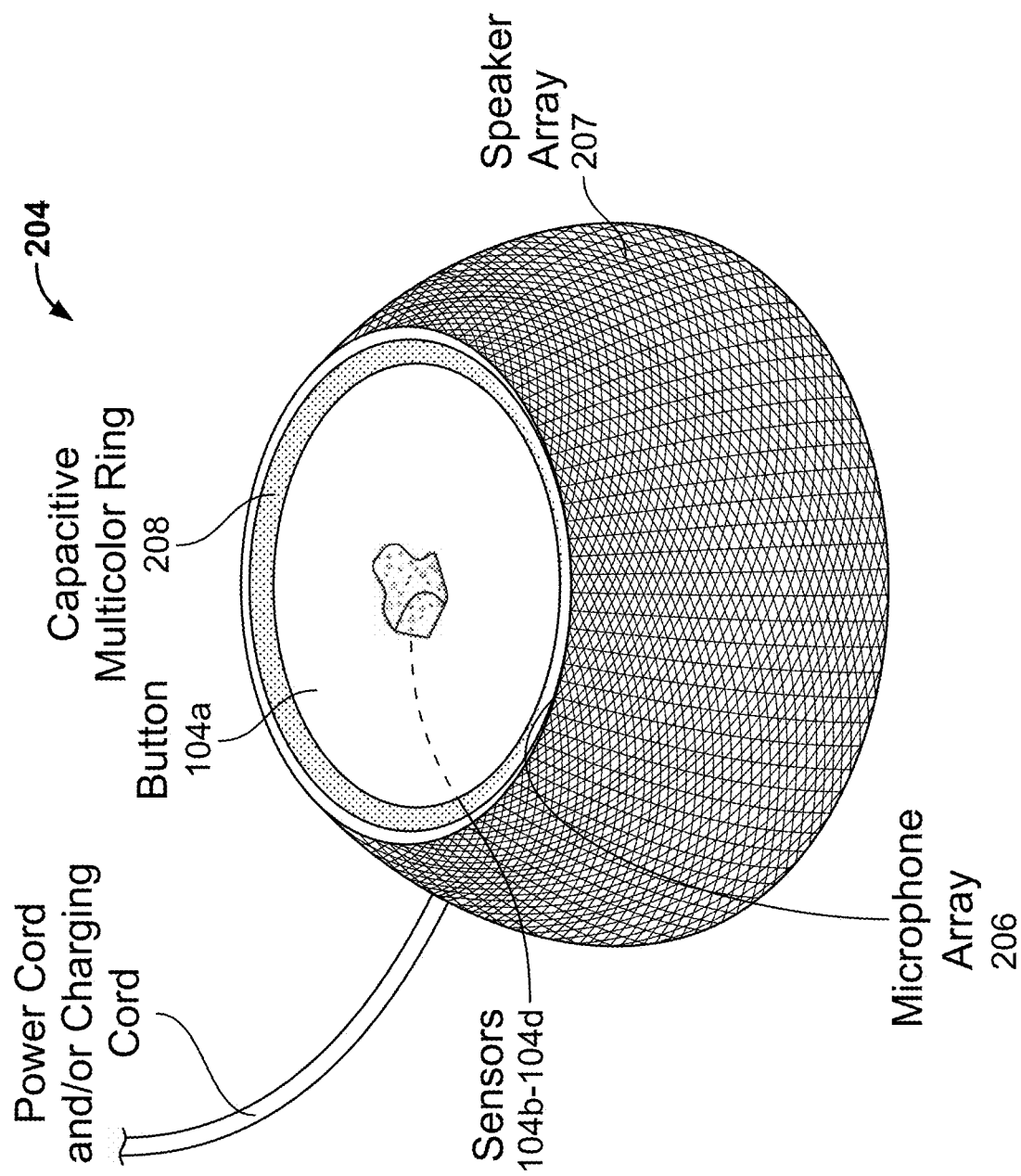
FIG. 4B is a design of an embodiment of the contextual controller.

FIG. 4A is a block diagram illustrating an embodiment of a system for contextual control. In one embodiment, the system of FIG. 4A is the context system (204) of FIG. 2. FIG. 4B is a design of an embodiment of the contextual controller.

In one embodiment, contextual system (204), includes a button (104a) close to a contextual input system, for example a capacitive multicolor ring (208). The button (104a) may be used to 'awaken' speech input, for example by tapping once, and 'mute' speech input, for example by tapping twice. In one embodiment, the button (104a) may be user configurable. For example, the button (104a) may toggle lights on and off, toggle shades open and close, and so forth. In one embodiment, the ring and/or dial (208) controls for example light brightness, and the center button (104a) toggles lights on/off. In that way if lights are set to 20%, a user may turn them on/off without losing the brightness they want to return to. The button may toggle the TV on/off, locks, shades open/close, or activate a scene such as "turn everything in the room/house on or off", but still preserve any gradient settings achieved via the ring/dial (208).

In one embodiment, environmental sensors and/or other sensors such as a motion sensor (104b), temperature sensor (104c), and/or light sensor (104d) are also used to either awaken speech input and/or provide a current context for device (204).

In one embodiment, microphone and/or a microphone array (206) are part of the contextual system (204). An array may be used, for example, to improve directional audio input, use beamforming techniques, and/or enhance noise cancellation. The microphone (206) coupled with processor (102) and/or memory (110) is used to provide a current context for the device (204). The device (204) may provide audio feedback to speech input by way of a speaker and/or speaker array (207). In one embodiment, the microphone array (206) is configured to accept a verbal input, wherein the processor (102) is further configured to determine a current context based at least in part on a natural language phrase from the verbal input For example, a user may utter "Josh, turn on the lights". The term "Josh" is a "wake word" to indicate that the user is speaking to the device (204). An alternative to using a wake word is a user tapping the button (104a), or the motion sensor (104b) sensing a user just entered a room. The phrase "turn on the lights" allows the device to switch on lights, and indicates the current context for the device (204) as a dimming switch, and this current context may be adapted for contextual input system (208).

In one embodiment, contextual input system (208) comprises a capacitive touch interface (402) comprising a touchable surface at least a portion of which defines a geometric shape. System (208) also comprises a sensing circuit (402) coupled to the capacitive touch interface may be configured to sense a capacitance associated with a currently touched position along the shape and provide an output associated with the sensed capacitance. The sensing circuit may be coupled to processor (102). In the example shown in FIG. 4B, a circle and/or ring is shown as a specific example of the shape without limitation, for example a capacitive multicolor touch ring as the capacitive touch interface (402). A haptic feedback may also be used to provide the sensation of rotating or dialing a ring.

To continue the example above, after the phrase "turn on the lights" is uttered by the user, under its current context the ring (208) acts as a dimmer switch:

In one embodiment, the user then may tap the ring (208) and it will turn yellow to indicate its current context as a dimmer switch, and set the current and/or default setting for dimness to the currently touched position along the circle of the tap. The user may then touch and/or slide around the ring to increase or reduce the brightness of the lights by way of mapping the currently touched position to the corresponding value of the attribute relative to a zero position, wherein the zero position is the initially touched position. In one embodiment, there is no predetermined convention for the zero position and a relative positioning is used: a user taps anywhere on the ring, and when they rotate clockwise/counter-clockwise the initial starting point goes up/down. For example, if the lights are at 28% and the user taps anywhere on the ring and rotates clockwise, lights increase above 28%, and likewise if the user taps anywhere on the ring and rotates counter-clockwise the light decrease below 28%. The initial state may have been 50% and the same would be true, thus the position of the finger does not necessarily dictate an absolute value but a relative value as the user moves along the path; or In one embodiment, after the phrase "turn on the lights" is uttered by the user, the ring (208) acts as a dimmer switch, and using a predetermined convention for the zero position, for example a 6 o'clock position representing lights fully off and a 12 o'clock position representing lights at 50%, the current setting for dimness is reflected on the ring in yellow to indicate its current context as a dimmer switch.

To continue the example, the same user may subsequently utter "Josh, turn on CNN" which may be associated with a current context with a volume level of a television set in the same zone/room playing CNN. The capacitive sensing ring may turn orange to indicate "television volume control" and no longer reflect a control on dimming, which was yellow.

Figure 4C:
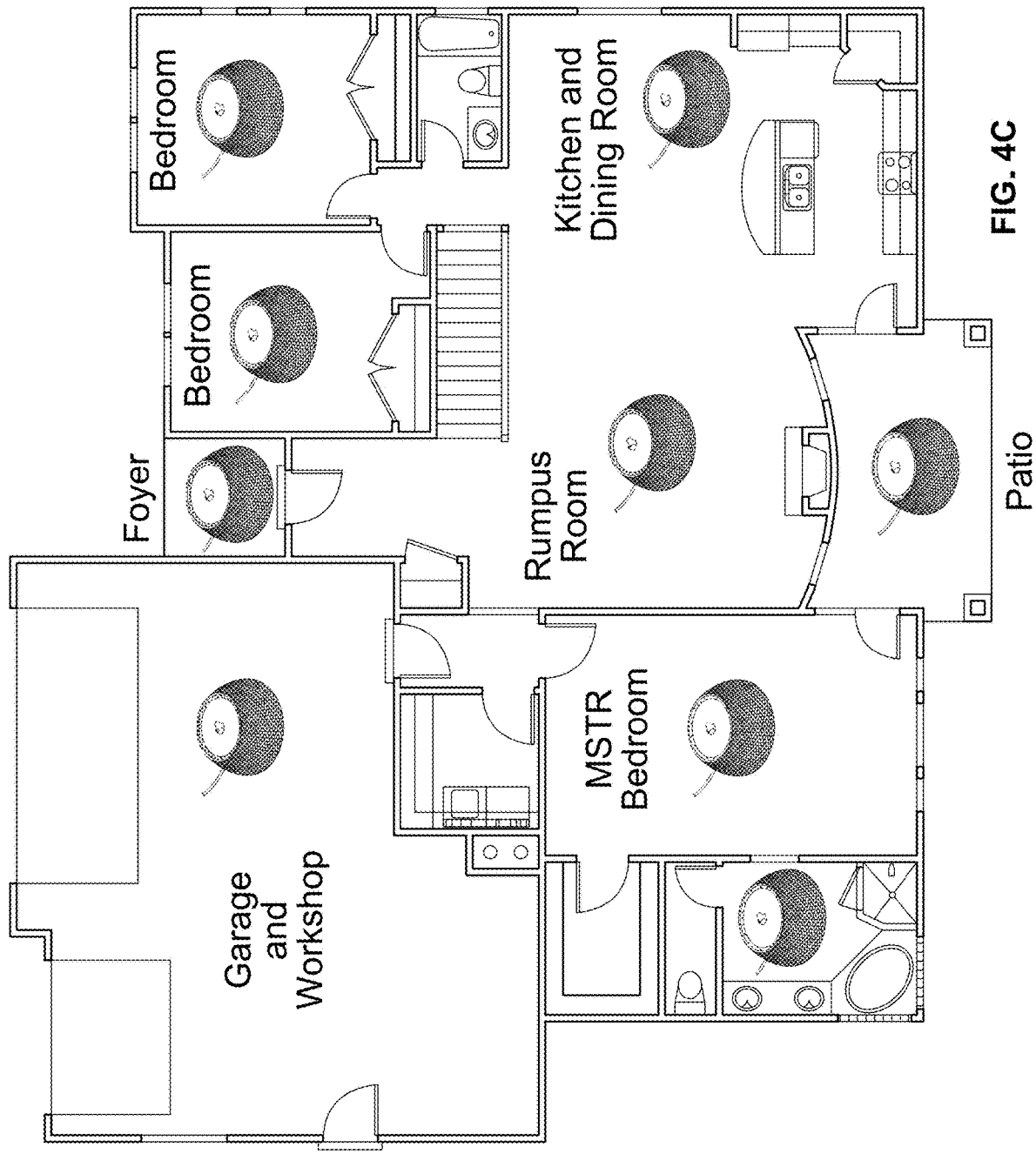
FIG. 4C shows an example deployment of the context devices.

Examples of attributes for control using device (204) include at least one of the following devices (210) to control:
Lights
Binary (on/off)—Lutron, Leviton, GE, etc.
Dimmable—Lutron, Leviton, GE, etc.
Warm/cool white (changing color temperature)—Hue, etc.
LED (full RGB spectrum)—Hue, LIFX, etc.
Thermostats
Nest, Honeywell, ecobee, etc.
Cameras (e.g. for streaming to a television/monitor)
Zoom In/Out—Nestcam, Axis, Mobotix, etc.
Speakers
Sonos, Autonomic, Denon, etc.
TVs
Sony, Samsung, IPTVs, etc.—volume/channel setting
Apple TV, Roku, set-top boxes, etc.
Switches
WeMo, WattBox, Crestron, etc.
Shades
Lutron, Somfy, QMotion, etc—open/close percentage, tilt percentage
Fans
Big Ass Fans, Lutron, etc—set speed, rotation direction
Garage doors
Chamberlain, Garageio, etc
Locks
Yale, Schlage, Lockitron, August, etc
Pool heaters
Jandy—iAquaLink, etc
Sprinklers
Rachio
Temperature for a shower
Floor heaters FIG. 4C shows an example deployment of the context devices. For a typical home automation system, there may be a context device (204) in each room, shown in FIG. 4C to include the garage/workshop, foyer, two bedrooms, master bedroom, master bathroom, rumpus room, kitchen/dining room, and rear patio. The context device (204) may be wall mounted with a fixed convention of orientation of the ring, or table mounted without a clear convention of ring orientation.

In one embodiment, a context device (204) in one room may affect the current context for other devices (204) in other rooms. The context devices (204) may be arranged in a mesh network, for example using a network interface (not shown in FIG. 4A) that may be wired and/or wireless. For example, from a second floor of a house a user may utter "Josh, turn all the downstairs lights on". When a user is now downstairs, each room device (204) may be set to a dimmer with a yellow ring (208). A second example, a user may utter "Josh, play music on the first floor". When a user is in any of the five rooms/zones on the first floor, each room device (204) may be set to a music volume control with a green ring (208).

Figure 5A:
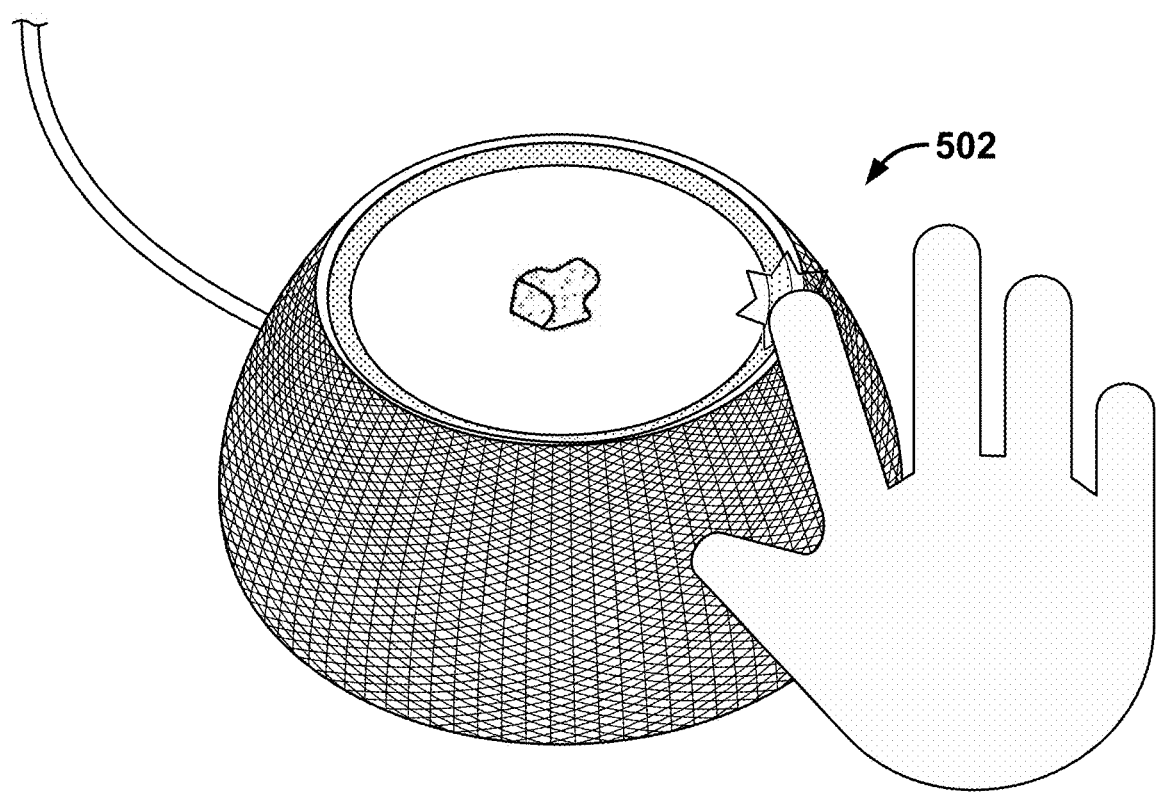
FIGS. 5A and 5B show an illustration of a sequence for an embodiment of a slider contextual input.
Figure 5B:
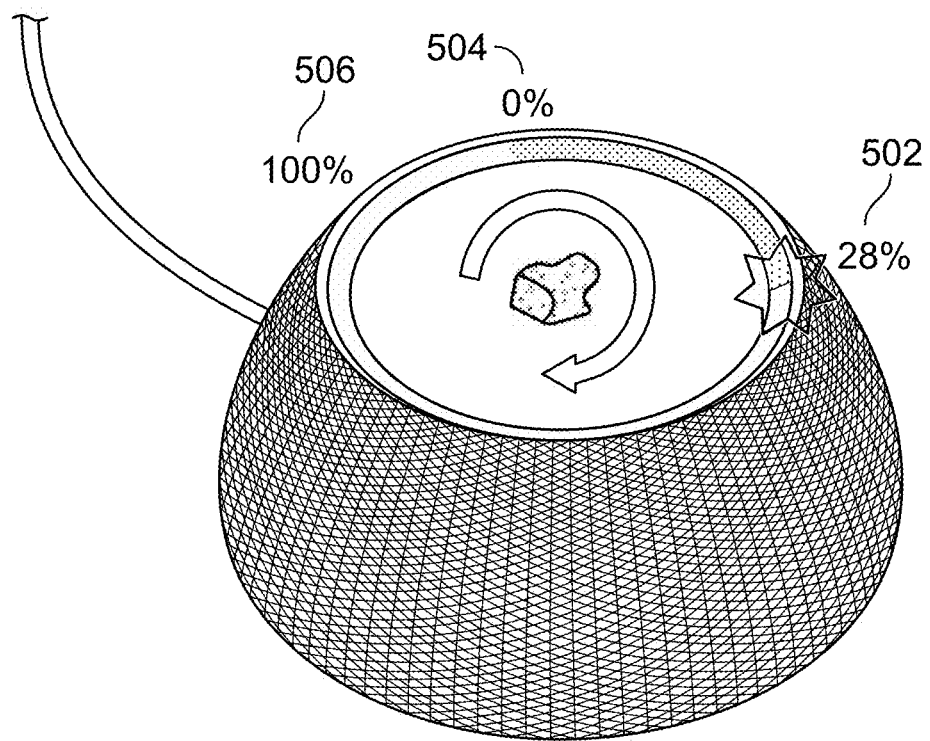

FIGS. 5A and 5B show an illustration of a sequence for an embodiment of a slider contextual input. In the example shown, a user has uttered the phrase "Josh, turn on CNN" and then touched the capacitive ring (208) at a point (502). The ring (208) then alights, using the initially touched point (502) as the current setting for the television volume, here to be annotated for clarity as 28%. The ring is colored orange, here shown as crosshatched, between a point computed to be 0% (504) and 28% (502), and the ring may be a neutral color such as grey/white between 28% (502) and 100% (506). The ring may be dark between 100% (506) and 0% (504). This gives a user an easy to understand convention for controlling volume, and communicates that the device (208)'s current context is to control television volume by using the color orange.

In one embodiment, other external controllers may control the same attribute, and the result of the external control is updated on the device (204). For example, if a second user uses a tablet to dim the lights to 10%, the ring (208) is updated to reflect a smaller yellow arc from 0% (504) to a 10% position (not shown in FIG. 5B).

In one embodiment, the button (104a) comprises an LCD screen that shows values, contextual/device icon, and/or contextual/device names. For example, if context refers to control of lights, a number may be displayed in the center of button (104a) showing an increase from 0% to 28% as the user dials from 6 o'clock counterclockwise with the word "LIGHTS" under the number and/or an icon for lights. When context is changed by pushing the button (104a) or uttering a phrase to television volume, the word "LIGHTS" and/or icon for lights is removed and a word "TV VOLUME" and/or icon for television volume is displayed along with the current numerical value for television volume. In one embodiment, the words and/or icons used along with the typeface and/or style for the numerical value is user configurable.

Figure 6A:
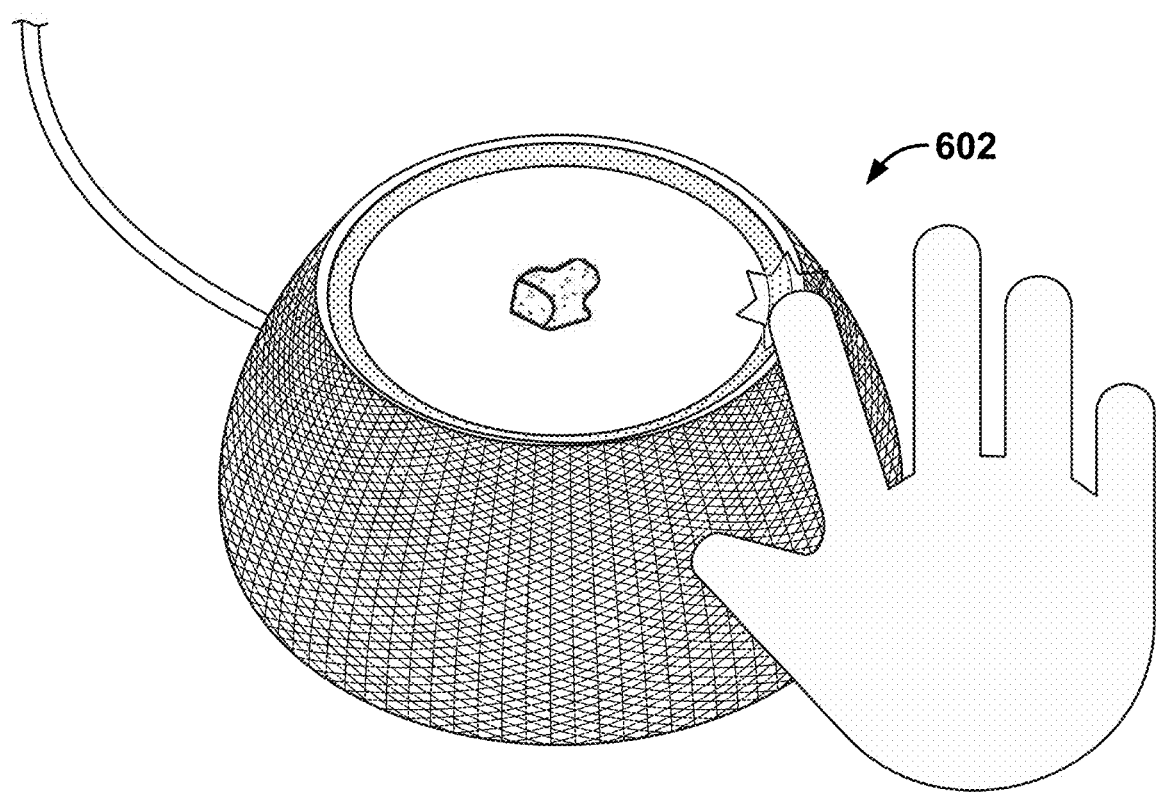
FIGS. 6A and 6B show an illustration of a sequence for an embodiment of a selection contextual input.
Figure 6B:
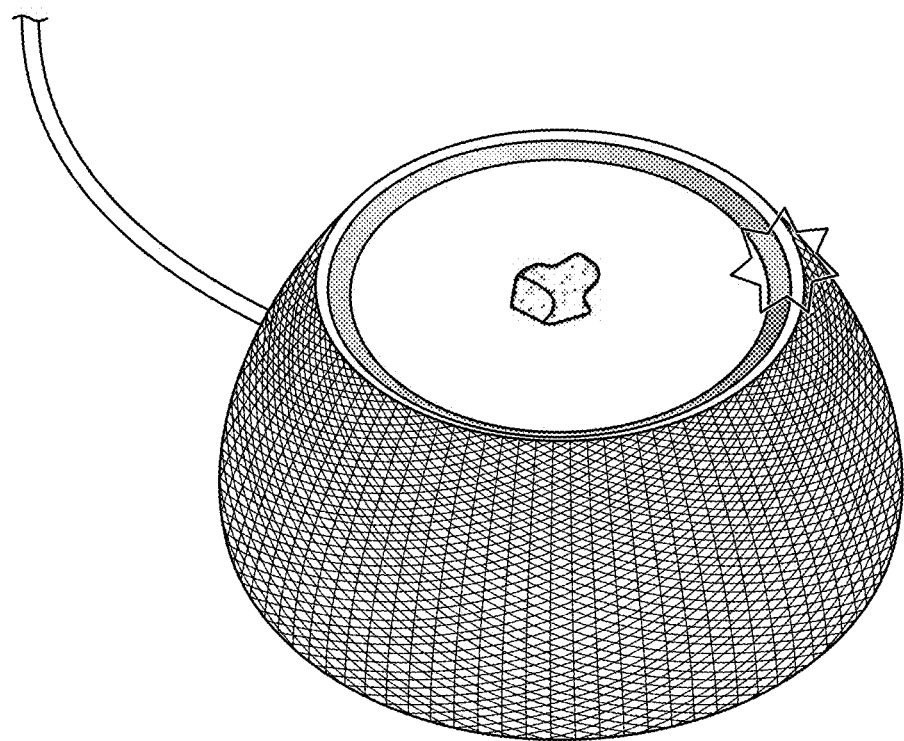

FIGS. 6A and 6B show an illustration of a sequence for an embodiment of a selection contextual input. In the example shown, a user has uttered the phrase "Josh, turn on the Hue mood lighting" and then touched the capacitive ring (208) at a point (602). The ring (208) then alights, using the initially touched point (602) as the current setting for the RGB lighting as red here to be shown monochromatically in various shades of greyscale. The ring shows a spectrum of color between red and blue for the user to select for the mood lighting color. This gives a user an easy to understand convention for selecting a color using the multicolor ring (208).

Figure 7:
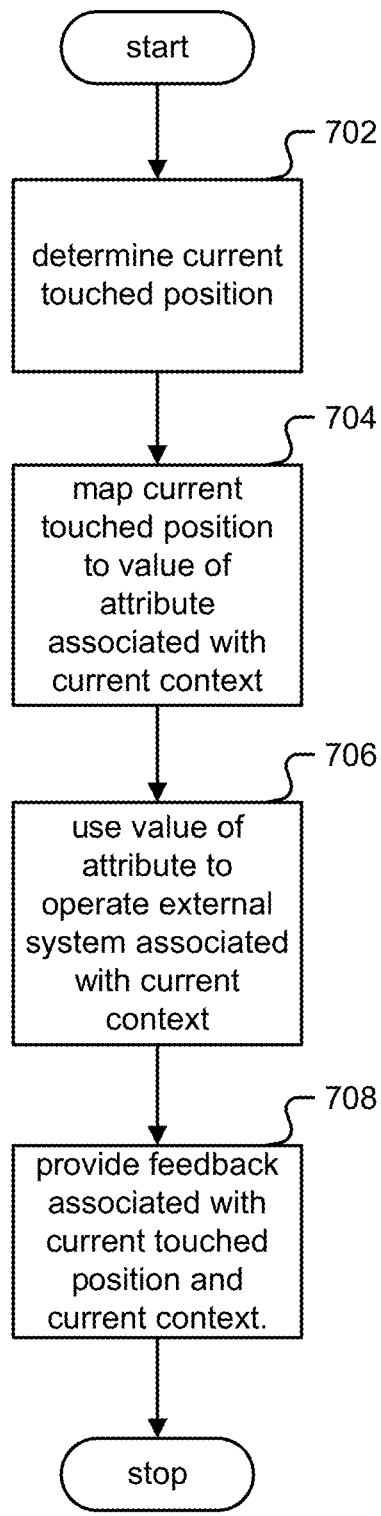
FIG. 7 is a flow chart illustrating an embodiment of a process for contextual control.

FIG. 7 is a flow chart illustrating an embodiment of a process for contextual control. In one embodiment, the process of FIG. 7 is carried out by device (204) in FIG. 2 and/or FIG. 4A.

In step 702, the currently touched position is determined based at least in part on output of the sensing circuit (404). In step 704, the currently touched position (502) is mapped to a corresponding value of an attribute associated with a current context. In one embodiment, the current context relates to home automation. In one embodiment, home automation controls one or more devices (210) each with one or more user controllable attributes. In one embodiment, the current context is based at least in part on a last controlled device, for example if a user utters "Josh, turn on the lights" the current context would be a dimmer for the lights that were turned on. In one embodiment, the current context is based at least in part on a last controlled attribute, for example if a user utters "Josh, dim the lights to 50%" the current context would be a dimmer for the lights that were dimmed to 50%.

In one embodiment, the attribute is at least one of the following: level; lights on/off; light dim level; light brightness level; light temperature; RGB color; thermostat level; temperature level; humidity level; camera pan level; camera tilt level; camera zoom level; camera on/off; sound level; volume level; speaker on/off/mute; television station; television frequency; television channel; radio station; radio frequency; radio channel; switch on/off; switch level; shade open/close; shade tilt; fan speed; fan rotation direction; garage door open/close; lock engaged/disengaged; pool temperature; and sprinkler on/off.

In step 706, the corresponding value of the attribute is used to operate an external system (210) associated with the current context in a manner determined at least in part by the corresponding value of the attribute. In step 708, a feedback associated with the determined currently touched position and the current context is provided via the capacitive touch interface (402). In one embodiment, the feedback is at least one of the following: a visual illumination; a haptic feedback; a series of RGB LEDs; an illumination of a color matching the current context; an illumination of lights from zero to the corresponding value of the attribute associated with the current context. In one embodiment, feedback is updated when the attribute associated with the current context is changed externally from the system, for example from a second user with a tablet.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a touch interface comprising a touchable surface at least a portion of which defines a geometric shape;
    a sensing circuit coupled to the touch interface and configured to sense a currently touched position along the geometric shape and provide an output comprising a spatial location along the geometric shape; and
    a processor coupled to the sensing circuit and configured to:
        determine the currently touched position, based at least in part on the output of the sensing circuit;
        operate an external system associated with the currently touched position; and
        provide via the touch interface a visual feedback along the geometric shape based at least in part on the determined currently touched position.

2. The system of claim 1, wherein:
    the touch interface is a touch ring;
    the geometric shape is a circle; and
    the currently touched position is a position along the circle.

3. The system of claim 1, wherein:
    the touch interface is a touch bar;
    the geometric shape is linear; and
    the currently touched position is a position along the bar.

4. The system of claim 1, wherein a zero position is at least one of the following: a 12 o'clock position; and an initially touched position.

5. The system of claim 1, wherein the external system is associated with home automation.

6. The system of claim 5, wherein home automation controls one or more devices each with one or more user controllable attributes.

7. The system of claim 6, wherein the external system is a last controlled device.

8. The system of claim 6, wherein the external system is a last controlled attribute.

9. The system of claim 8, wherein the last controlled attribute is at least one of the following: level; lights on/off; light dim level; light brightness level; light temperature; RGB color; thermostat level; temperature level; humidity level; camera pan level; camera tilt level; camera zoom level; camera on/off; sound level; volume level; speaker on/off/mute; television station; television frequency; television channel; radio station; radio frequency; radio channel; switch on/off; switch level; shade open/close; shade tilt; fan speed; fan rotation direction; garage door open/close; lock engaged/disengaged; pool temperature; shower temperature; floor heater; and sprinkler on/off.

10. The system of claim 1, wherein the visual feedback is at least one of the following: a visual illumination; a haptic feedback; a series of RGB LEDs; an illumination of a color matching the current context; an illumination of lights from zero to the corresponding value of the attribute associated with the current context.

11. The system of claim 10, wherein the visual feedback is updated when an attribute associated with the external system is changed.

12. The system of claim 1, further comprising a microphone coupled to the processor and configured to accept a verbal input, wherein the processor is further configured to determine a current context based at least in part on a natural language phrase from the verbal input.

13. The system of claim 12, further comprising a button coupled to the processor and configured to awaken speech input or mute speech input.

14. The system of claim 12, further comprising a network interface coupled to the processor and configured to network to a second system in a different zone, wherein the processor is further configured to determine a current context for the system based at least in part on a second natural language phrase from the second system.

15. The system of claim 14, wherein the network interface is a wireless network interface.

16. The system of claim 12, further comprising a motion sensor coupled to the processor and configured to awaken the microphone or mute the microphone.

17. The system of claim 1, further comprising a temperature sensor coupled to the processor and configured to accept a temperature input, wherein the processor is further configured to determine a current context based at least in part on the temperature input.

18. The system of claim 1, further comprising a light sensor coupled to the processor and configured to accept a light input, wherein the processor is further configured to determine a current context based at least in part on the light input.

19. The system of claim 1, wherein the system is part of a mesh network of a plurality of systems.

20. A method, comprising
    determining a currently touched position on a touch interface based at least in part on sensing a currently touched position along a geometric shape and providing an output comprising a spatial location along the geometric shape, wherein the touch interface comprises a touchable surface at least a portion of which defines the geometric shape;
    operating an external system associated with the currently touched position; and
    providing via the touch interface a visual feedback along the geometric shape based at least in part on the determined currently touched position.

21. A computer program product, the computer program product being embodied in a non-transitory computer readable storage medium and comprising computer instructions for:
    determining a currently touched position on a touch interface based at least in part on sensing a currently touched position along a geometric shape and providing an output comprising a spatial location along the geometric shape, wherein the touch interface comprises a touchable surface at least a portion of which defines the geometric shape;
    operating an external system associated with the currently touched position; and
    providing via the touch interface a visual feedback along the geometric shape based at least in part on the determined currently touched position.

\* \* \* \* \*